United States Patent [19]
Rampley

[11] 4,435,105
[45] Mar. 6, 1984

[54] ADJUSTABLE LOCK ARRANGEMENT AND METHOD FOR MAKING SAME

[75] Inventor: Neil Rampley, La Porte, Ind.

[73] Assignee: Heath Manufacturing Company, Coopersville, Mich.

[21] Appl. No.: 350,735

[22] Filed: Feb. 22, 1982

[51] Int. Cl.³ .............................................. F16B 7/10
[52] U.S. Cl. .................................... 403/109; 403/342; 403/350
[58] Field of Search ............... 403/350, 351, 352, 342, 403/DIG. 7, 320, 109, 314, 374; 248/231

[56] References Cited

U.S. PATENT DOCUMENTS

| | | |
|---|---|---|
| 958,440 | 5/1910 | Sackman . |
| 1,511,677 | 10/1924 | Page . |
| 1,924,858 | 8/1933 | Hopp ........................... 248/7 |
| 2,168,499 | 8/1939 | Spicacci ................... 403/374 X |
| 2,184,358 | 12/1939 | Moore ......................... 248/191 |
| 2,893,766 | 7/1959 | Meyer ........................... 287/58 |
| 3,239,243 | 3/1966 | Grellsson ........................ 285/7 |
| 3,367,632 | 2/1968 | Vail ................................ 254/139 |
| 3,762,674 | 10/1973 | Ortega ...................... 403/374 X |
| 3,851,846 | 12/1974 | Long ......................... 403/109 X |
| 4,076,437 | 2/1978 | Mazolla ..................... 403/109 X |
| 4,111,470 | 2/1978 | Welcker ....................... 285/320 |

FOREIGN PATENT DOCUMENTS

| | | |
|---|---|---|
| 109796 | 2/1940 | Australia . |
| 168411 | 9/1921 | United Kingdom . |
| 357617 | 9/1931 | United Kingdom ............... 403/314 |
| 482779 | 4/1938 | United Kingdom . |
| 682684 | 8/1979 | U.S.S.R. . |

*Primary Examiner*—Wayne L. Shedd
*Attorney, Agent, or Firm*—Price, Heneveld, Huizenga & Cooper

[57] ABSTRACT

An adjustable lock arrangement for rods, tubes, and the like, comprising a rigid collar having a central opening in which a rod segment is closely received. The interior surface of the collar includes a keyway in which an eccentric key is rotatably mounted. The key includes a first surface, which when rotated toward the rod, permits the collar and rod to slide telescopingly with respect to each other, and a second, outwardly protruding surface, which is rotated into abutting engagement with the rod to frictionally lock the collar and rod in place. The collar may be formed as a separate unit for use as a couple, an adjustor, et cetera, or integrally constructed with the end of a tube for interlocking telescoping segments of a support, or the like.

41 Claims, 10 Drawing Figures

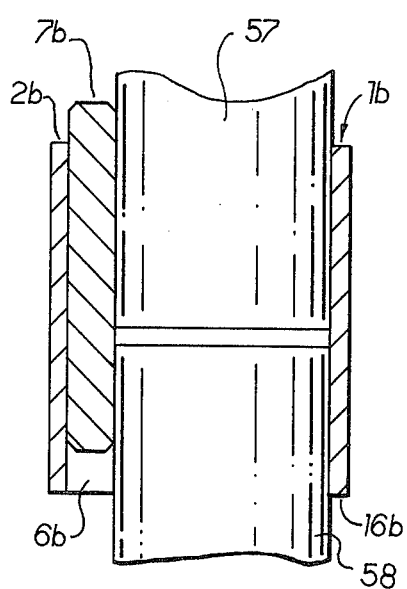
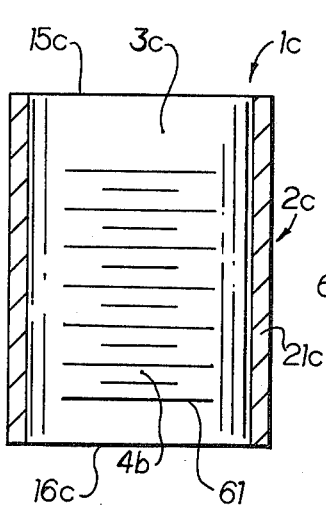
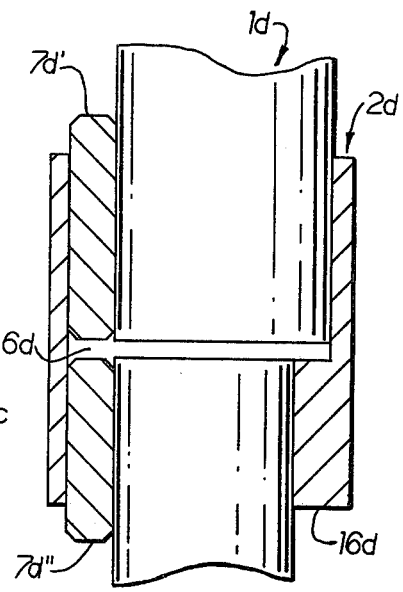
FIG. 6  FIG. 7  FIG. 8
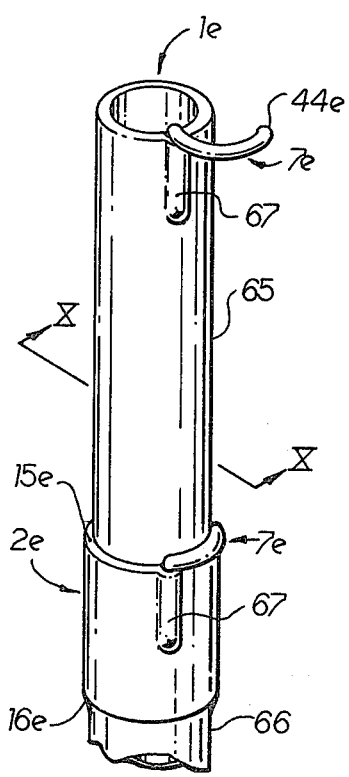
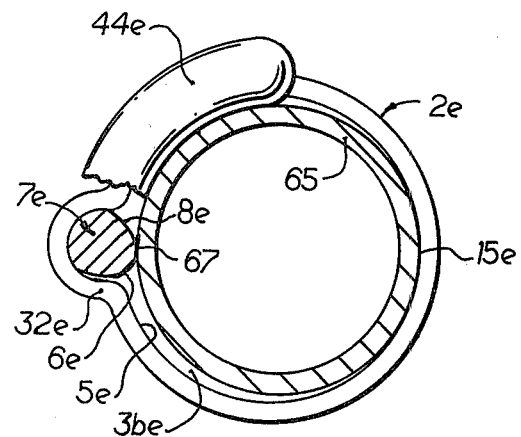
FIG. 9  FIG. 10

ADJUSTABLE LOCK ARRANGEMENT AND METHOD FOR MAKING SAME

BACKGROUND OF THE INVENTION

The present invention relates to locks, and in particular, to an adjustable friction lock arrangement for rods, tubes, and the like.

A variety of locking devices are available for interconnecting different elements of a telescoping assembly. One type of locking device comprises a clamp, which is selectively manipulated to abuttingly engage an adjacent portion of the assembly and frictionally retain the same in place. Such adjustable locks are typically easy to use, but generally do not provide very substantial supporting strength. Hence, it would be quite advantageous to provide a friction-type of lock which is capable of supporting extremely large weights, while having an engaging arrangement which when locked, will not permanently deform the element clamped, so that it may be used repeatedly in a variety of different positions without weakening or damaging any of the members of the assembly.

One example of a clamp-type adjustable lock is disclosed in U.S. Pat. No. 2,893,766 to Meyer, which includes a rod-like member retained parallel with another rod-like member having an eccentric cross-sectional shape. A helical coil surrounds the two rod members, so that when the eccentric rod is rotated, the helical spring is tensed, thereby frictionally engaging two rods, and interconnecting the same. One problem associated with this type of lock is that the weight supporting capacity of the lock is limited, since the clamping forces are generated solely by the resiliency of the helical spring. Further, this type of prior art device is somewhat difficult to assemble, and therefore has restricted practical applications.

A non-frictional locking device is disclosed in U.S. Pat. No. 4,111,470 to Welcker, which includes an eccentric key that is carried in a hollow tubular member. The tubular element receives a second hollow rod element therein, with a notch in which the key is pivoted to positively interconnect the two tubular sections. Although this type of couple securely interconnects the two members of the assembly, it does not employ a frictional type of lock, such that there are only a predetermined number of positions in which the tubular segments can be interconnected.

SUMMARY OF THE INVENTION

One aspect of the present invention is to provide an adjustable lock arrangement for rods, tubes, and the like, comprising a rigid collar having a central opening in which a rod segment is closely received. The interior surface of the collar includes a keyway in which an eccentric key is rotatably mounted. The key includes first and second surfaces which respectively engage and disengage the exterior surface of the rod to selectively connect the collar to the rod at virtually any position therealong.

Another aspect of the present invention is a method for making an adjustable lock arrangement, comprising selecting first and second tubular segments shaped for close telescoping reception in one another. A pocket is die formed in the end of the outer tube to form a keyway in which an eccentric key is rotatably mounted to selectively lock and unlock the collar and rod.

The principal objects of the present invention are to provide an adjustable lock arrangement which is capable of supporting very heavy weights, yet requires minimum locking force. A frictional clamping action securely interconnects the two telescoping members in infinitesimally small increments. The lock arrangement is very uncomplicated, so as to minimize the cost and difficulty associated with both manufacture and assembly. The present invention provides an extremely rugged construction, which is particularly adapted for use in outside environments, such as with boat docks, bird feeder supports, swing sets, gymnastic equipment, chain link fencing, and the like. An eccentric key lock arrangement permits very wide tolerance between the collar and the rod, so that the lock is not adversely affected by surface anomalies such as oxidation, dents, paint, and the like.

These and other features, advantages, and objects of the present invention will become further understood and appreciated by those skilled in the art by reference to the following written specification, claims and appended drawings.

BRIEF DESCRIPTION OF THE DRAWINGS

FIG. 6 is a longitudinal cross-sectional view of yet another embodiment of the adjustable lock arrangement.

FIG. 7 is a longitudinal cross-sectional view of yet another embodiment of the lock arrangement, revealing a back position of a locking sleeve.

FIG. 8 is a longitudinal cross-sectional view of yet another embodiment of the adjustable lock arrangement.

FIG. 9 is a fragmentary, perspective view of yet another embodiment of the adjustable lock arrangement.

FIG. 10 is a transverse, cross-sectional view of the lock shown in FIG. 9, taken along the line X—X of FIG. 10, with a portion thereof broken away.

DETAILED DESCRIPTION OF THE PREFERRED EMBODIMENTS

Figure 1:
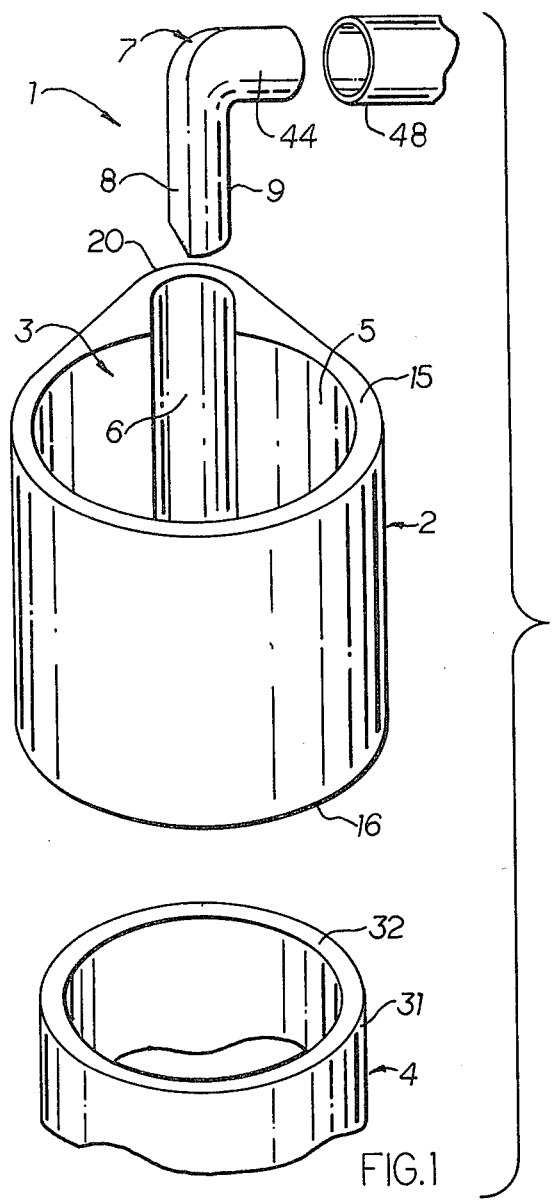
FIG. 1 is an exploded, perspective view of an adjustable lock arrangement embodying the present invention.

For purposes of description herein, the terms "upper," "lower," "right," "left," "rear," "front," "vertical," "horizontal" and derivativesthereof shall relate to the invention as oriented in FIG. 1. However, it is to be understood that the invention may assume various alternative orientations, and step sequences, except where expressly specified to the contrary.

The reference numeral 1 (FIG. 1) generally designates an adjustable locking arrangement for rods, tubes and the like, embodying the present invention, comprising a rigid collar 2 having a central opening 3 in which a rod 4 is closely received. The interior surface 5 of collar 2 includes a keyway 6 in which an eccentric key 7 is rotatably mounted. Key 7 includes a first surface 8, which when rotated toward rod 4 permits collar 2 and rod 4 to slide telescopingly with respect to each other, and an outwardly protruding, second surface 9, which is rotated into abutting engagement with rod 4 to frictionally lock collar 2 and rod 4 in place. Collar 2 may be formed as a separate unit, as illustrated in FIGS. 1-9, for use as a couple, an adjustor, et cetera, or may be integrally constructed in the ends of tubes, as illustrated in FIGS. 10 and 11, for interlocking the telescoping tube segments of a support, or the like.

In the embodiments illustrated in FIGS. 1-9, collar 2 comprises a cylindrically-shaped structure, which is rigidly formed by conventional means, such as forging, casting or the like. The upper and lower ends 15 and 16 (FIG. 1) respectively of collar 2 are disposed generally parallel, and perpendicular to the central, longitudinal axis of the collar. In one example of the present invention, collar 2 has a length in the nature of 2 to 4 inches, an inside diameter in the range of 1½ to 2 inches, a sidewall thickness of approximately ⅛ to ¼ inches, and is constructed of cast aluminum, such that it is substantially impervious to oxidation. However, it is to be understood that the present invention contemplates alternative dimensions, as would be apparent to one having ordinary skill in the art.

Figure 2:
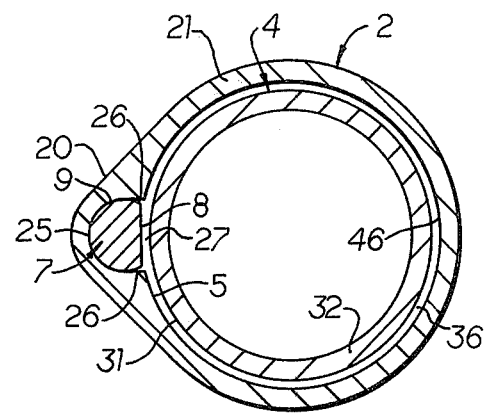
FIG. 2 is a transverse cross-sectional view of the lock arrangement, shown in an unlocked condition.
Figure 3:
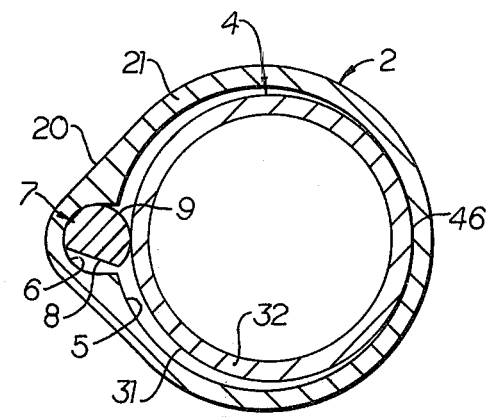
FIG. 3 is a transverse cross-sectional view of the lock arrangement, shown in a locked condition.
Figure 4:
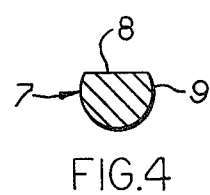
FIG. 4 is a transverse cross-sectional view of a key portion of the lock arrangement.
Figure 5:
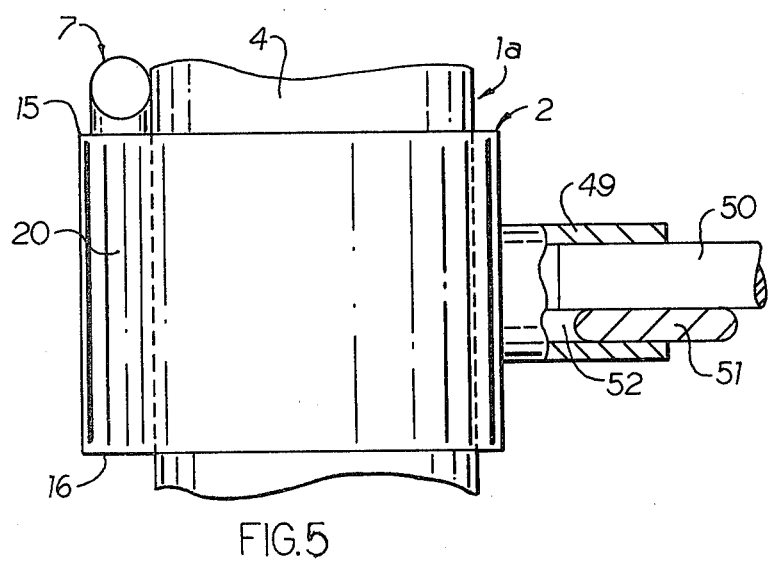
FIG. 5 is a fragmentary, elevational view of another embodiment of the lock arrangement, with portions thereof broken away to reveal internal construction.

As best illustrated in FIGS. 2 and 3, the generally cylindrically-shaped collar 2 includes a protrusion or rounded rib 20 extending longitudinally along one side thereof, in the nature of a housing in which keyway 6 is disposed. The collar sidewall 21 tapers outwardly to the end of rib 20 so as to provide a smooth, rounded exterior surface, with improved strength and rigidity.

In the examples illustrated in FIGS. 1-9, keyway 6 has a substantially U-shaped transverse cross section, comprising a semicircular base 25, and parallel sidewalls 26 extending tangentially therefrom to the interior surface 5 of collar 2. Keyway 6 opens into and communicates with the central opening 3 of collar 2, and forms a window 27 through which the second surface 9 of key 7 protrudes in the locked position, as described in greater detail hereinafter. In the embodiments illustrated in FIGS. 1-8, keyway 6 extends along the entire length of collar 2, through collar ends 15 and 16 in the nature of a channel, so that key 7 can be inserted into the keyway from either end thereof. Preferably, key 7 and keyway 6 are sized so that key 7 fits loosely in keyway 6 in the unlocked position, and can be removed laterally from collar 2, through window 27, when the collar 2 and tube 4 are disassembled.

Rod 4 preferably comprises a thin-walled, hollow tube having a cylindrical shape with a relatively smooth exterior surface 31, and a sidewall 32. Tube sidewall 32 is semi-rigid, whereby it elastically deforms slightly in a radially inwardly direction when engaged by key 7. The illustrated tube 4 has an outside diameter in the range of 1 7/16 to 1 15/16 inches, and a sidewall thickness of approximately 1/16 inches. Tube 4 may be constructed of galvanized steel, or other similarly suitable materials.

The exterior surface 31 of tube 4 and the interior surface 5 of collar 2 are preferably sized so as to provide substantial clearance therebetween, to insure smooth, nonbinding translation of the collar and tube with respect to each other, even in the presence of surface anomalies, such as rust, dents, paint and the like. The gap or clearance 36 between tube 4 and collar 2, which is exaggerated in FIGS. 2 and 3 for illustrative purposes, is preferably in the range of 1/32 to ⅛ inches.

Key 7 is rotatably mounted in keyway 6 for rotation about an axis disposed generally parallel with the longitudinal axis of the keyway. Key 7 has an eccentric or noncircular transverse cross-sectional shape, with first and second surfaces 8 and 9 circumferentially spaced apart on the key. The first key surface 8 is disposed sufficiently close to the rotational axis of key 7 in keyway 6 that when first surface 8 is rotated into a position close to tube 4, as illustrated in FIG. 2, the key assumes a non-abutting relationship with the exterior surface 31 of tube 4 to permit relative longitudinal translation between collar 2 and tube 4. The second key surface 9 is spaced sufficiently apart or radially outwardly from the rotational axis of key 7 in keyway 6 that when the second surface 9 is rotated into a position closest to tube 4, as illustrated in FIG. 3, the second surface 9 abuttingly engages the exterior surface 31 of tube 4, and frictionally locks collar 2 to tube 4. Preferably, the second key surface 9 is curvilinear, and engages the exterior surface 31 of tube 4 with a wedging or camming action that provides a very secure lock that requires minimum engagement force.

In this example, key 7 has a generally cylindrical shape with a flat extending along one side thereof, which forms a D-shaped transverse cross section, such that the flat forms the first key surface 8, and the remainder of the cylindrical exterior of the key forms the second key surface 9. The length of key 7 is selected in accordance with the locking force required for the particular application. The longer the key 7, the greater the locking force that is achieved for any particular configuration.

Key 7 also preferably includes a laterally extending handle 44 to facilitate manual rotation of the key in keyway 6 between the locked position (FIG. 3) and the unlocked position (FIG. 2). In this example, key 7 has a one-piece construction, and is integrally formed from a rod that is bent into an L-shaped member to form a handle 44, with a flat cut or ground along one side thereof.

The handle 44 of key 7 preferably extends along an axis disposed substantially perpendicular with the flat 39 on key 7 for purposes to be described in greater detail hereinafter. In the unlocked position shown in FIG. 2, the flat portion of key 7 is recessed behind window 27, such that the key does not protrude into the central opening 3 of collar 2, thereby permitting free sliding translation between collar 2 and tube 4. Rotation of key 7 ninety degrees (90°) in either a clockwise or counterclockwise direction, as viewed in FIGS. 2 and 3, engages the cylindrical surface of the key with the outside surface of tube 4 to frictionally interconnect collar 2 on tube 4, as shown in FIG. 3. In this position, handle 44 abuts the exterior surface 31 of tube 4 to prevent further rotation of the key. As key 7 is rotated into the locked position, collar 2 is shifted laterally (to the left in FIGS. 2 and 3) with respect to tube 4, to take up the clearance or gap 36 between collar 2 and tube 4, and force the side 46 of collar 2 opposite keyway 6 into abutment with the adjacent portion of tube 4. Keyway 7 is sized so that engagement between the second key surface 9 and the exterior surface 31 of tube 4 elastically deforms the tube sidewall 21 slightly radially inwardly to provide a very secure connection. The pressure exerted by key 7 on tube 4 will, if great enough, tend to squeeze the tube into a slightly elliptical or elongate transverse cross-sectional shape.

A tool 48 (FIG. 1) may be provided to facilitate manually shifting key 7 between the locked and unlocked positions. In this example, tool 48 comprises a rigid tube or pipe having an inside diameter size for close reception over the handle portion 44 of key 7. Tool 48 extends the effective length of handle 44, thereby reducing the force required to achieve locking torque.

Additional embodiments of the present invention are illustrated in FIGS. 5-10. Since these embodiments are similar to the previously described locking arrangement 1, similar parts appearing in FIGS. 1-4 and 5, 6, 7, 8 and 9-10 are represented by the same corresponding reference numerals, except for the suffixes "a," "b," "c," "d," and "e" respectively in the numerals of the latter.

Lock arrangement 1a (FIG. 5) is quite similar to lock arrangement 1, except that it includes a second rigid collar 49 which extends perpendicular from a medial portion of collar 2a, and is adapted to mount a cross brace 50 therein for uses such as boat dock supports, gymnasium equipment, and the like. Cross brace 50 is selectively locked in collar 49 by an eccentric key 51 and keyway 52, constructed similarly to lock arrangement 1. The illustrated cross brace 50 comprises a solid, rigid rod, constructed of steel.

Lock arrangement 1b (FIG. 6) is nearly identical with above described arrangement 1, except that it is used as a couple to join the adjacent ends of a pair of tubes 57 and 58. Keyway 6b extends along the full length of collar 2b, and key 7b has a length which extends along a major portion of keyway 66b, so as to provide sufficient frictional gripping forces on both ends of tubes 57 and 58 to interconnect the same within collar 2b.

Locking arrangement 1c (FIG. 7) is substantially identical with the previously described embodiments, except that teeth or serrations 61 are disposed along the rear half of collar 2c, opposite the associated keyway, and provide additional gripping forces when the tube is shifted into engagement with the collar in the locked position.

Locking arrangement 1d (FIG. 8) is nearly identical with arrangement 1b, except that the ends of collar 2d are shaped to receive different diameter tubes therein, and two separate keys 7d' and 7d" are mounted in keyway 6d, instead of a single key.

Locking arrangement 1e (FIGS. 9-10) is somewhat different than the previously described embodiments, insofar as collar 2e is formed integrally in the ends of telescoping tube segments 65 and 66 to selectively interconnect the same. The keyways 6e in tube sections 65 and 66 are formed by rolling or die forming a U-shaped channel or pocket 67 in the upper ends of the tube sections. Pockets 67 are thus integral with the associated ends of tube segments 65 and 66. The handle portion 44e of keys 7e are arcuately formed so that they generally conform to the exterior surface of tube 65 in the locked position, as shown in FIGS. 9 and 10. Also, the locking surfaces 9e of keys 7e have an outwardly protruding lobe 67 which elastically deforms the inner tube 65 slightly inwardly in the closed position. Handle 44e is angularly positioned with respect to lobe 67, such that in the fully closed position, the resiliency of the deformed inner tube 65 securely retains key 7e in an overcentered, locked position, as shown in FIG. 10. Lobe 67 has a generally ovate shape, and may be used to form an overcentered lock with the L-shaped key 7 illustrated in FIGS. 1-8. The straight handle portion 44 of key 7 abuts the outer surface of tube 4 to retain the key in the overcentered, locked position.

Locking arrangements 1-1e each include a key lock mechanism for selectively interconnecting telescoping tube segments, which can be adjusted in infinitesimally small increments. The eccentric key 7 and rigid collar 2 are capable of supporting very heavy weights, while requiring minimum locking force. The lock can be used in a wide variety of different applications, such as pole lamp supports, and the like, and is particularly adapted for outside uses, such as boat docks, bird feeder supports, swing sets, et cetera. The collar 2 may be formed either as a separate unit (FIGS. 1-8) as for couples, adjustors, et cetera, or can be integrally constructed with the ends of the tubes (FIGS. 9-10) to provide a telescoping tubing lock. The uncomplicated construction of the locking arrangement provides a structure which is both economical to manufacture and easy to use.

In the foregoing description it will be readily appreciated by those skilled in the art that modifications may be made to the invention without departing from the concept disclosed herein. Such modifications are to be considered as included in the following claims, unless these claims by their language expressly state otherwise.

The embodiments of the invention in which an exclusive property or privilege is claimed are defined as follows:

1. An adjustable lock arrangement for rods and the like, comprising:

a rigid collar having a central opening and a central, longitudinal axis;

a rod having an exterior surface shaped for close, telescoping reception in the central opening of said collar;

said collar having an interior surface defining said central opening, with an elongate keyway extending along at least a portion of said interior surface in a direction generally parallel with the longitudinal axis of said collar; said keyway opening into said central opening, and having a central, longitudinal axis;

a key rotatably mounted in said keyway for rotation about an axis disposed generally parallel with the longitudinal axis of said keyway; said key having an eccentric transverse cross-sectional shape, with first and second circumferentially spaced apart surfaces; said key being rotatable in said keyway between locked and unlocked positions;

said first key surface being disposed sufficiently close to the rotational axis of said key that when said first key surface is located in the unlocked position, said first key surface is in a non-abutting relationship with the exterior surface of said rod and permits relative longitudinal translation between said collar and said rod;

said second key surface being spaced sufficiently apart from the rotational axis of said key that when said second key surface is located in the locked position, said second key surface abuttingly engages the exterior surface of said rod and frictionally locks said collar to said rod, whereby said key rotates to frictionally engage and lock said collar and rod.

2. A lock arrangement as set forth in claim 1, wherein:

said second key surface is curvilinear to engage the exterior surface of said rod with a camming action.

3. A lock arrangement as set forth in claim 2, wherein:

said rod comprises a thin-walled, hollow tube with a semi-rigid sidewall which elastically deforms in a radially inwardly direction when engaged by said key to securely lock said collar onto said tube.

4. A lock arrangement as set forth in claim 3, wherein:
said key includes a laterally extending handle to facilitate manual rotation of said key between locked and unlocked positions.

5. A lock arrangement as set forth in claim 4, wherein:
said second key surface comprises a generally ovate lobe which engages and deforms an adjacent portion of said tube during the locked position, and is continuously urged into the unlocked position by the resiliency of the deformed tube portion;
said handle is oriented in a predetermined angular relationship with respect to said lobe, wherein said handle abuts said tube to retain said key in an over-centered, locked position on said tube.

6. A lock arrangement as set forth in claim 5, wherein:
said keyway extends through one end of said collar to facilitate insertion and removal of said key from said keyway.

7. A lock arrangement as set forth in claim 6, wherein:
said key has a length which is selected in accordance with the locking force required for a particular application.

8. A lock arrangement as set forth in claim 7, wherein:
said first and second key surfaces are positioned 90° apart.

9. A lock arrangement as set forth in claim 8, wherein:
said key has a generally cylindrical shape with a flat extending along one side thereof.

10. A lock arrangement as set forth in claim 9, wherein:
said keyway has a generally U-shaped transverse cross section.

11. A lock arrangement as set forth in claim 10, wherein:
said handle has an arcuate plan shape adapted to generally conform with the exterior surface of said tube.

12. A lock arrangement as set forth in claim 11, wherein:
said handle and said key are integrally formed from a length of solid rod.

13. A lock arrangement as set forth in claim 12, wherein:
said keyway extends along a major portion of the length of said collar.

14. A lock arrangement as set forth in claim 13, wherein:
said key extends along a major portion of said keyway.

15. A lock arrangement as set forth in claim 14, wherein:
the central opening of said collar, and the outer surface of said tube are cylindrical in shape, and have respective diameters; and
the diameter of the central opening of said collar is greater than the outside diameter of said tube by an amount in the range of 1/32 to ⅛ inches to insure smooth, non-binding translation of said collar over said tube even in the presence of surface anomalies.

16. A lock arrangement as set forth in claim 15, including:
a second, thin-walled tube having one end shaped to telescopingly receive said first named tube therein; and wherein
said collar is integrally formed in the one end of said second tube, and said key detachably interconnects said first and second named tubes in a selected longitudinal relationship.

17. A lock arrangement as set forth in claim 16, wherein:
said one end of said second tube includes a sidewall defining said collar, with a die formed pocket which defines said keyway.

18. A lock arrangement as set forth in claim 17, wherein:
said pocket is integral with said collar.

19. A lock arrangement as set forth in claim 15, wherein:
said central opening extends through opposite ends of said collar, thereby permitting said collar to slide freely over said tube, and to be locked thereto at any position along its length.

20. A lock arrangement as set forth in claim 19, wherein:
said collar has a length sufficient to simultaneously receive one end of said tube, and one end of a second tube therein; and
said key extends along a major portion of said keyway to engage the one ends of both said first and second tubes in the locked position and securely interconnect the same.

21. A lock arrangement as set forth in claim 19, including:
a second rigid collar extending transversely from said first named collar, and adapted to receive a rod-shaped cross brace therein; and
said second collar having a keyway with an eccentric key rotatably received therein; said key having a first surface which when positioned adjacent said cross brace permits relative longitudinal translation therebetween, and a second surface which is rotated into abutting contact with said cross brace to frictionally interconnect the same.

22. A lock arrangement as set forth in claim 19, including:
serrations on that portion of said collar interior surface disposed opposite said keyway for gripping engagement with the exterior surface of said tube.

23. A lock arrangement as set forth in claim 1, wherein:
said rod comprises a thin-walled hollow tube with a semi-rigid sidewall which elastically deforms in a radially inwardly direction when engaged by said key to securely lock said collar onto said tube.

24. A lock arrangement as set forth in claim 1, wherein:
said key includes a laterally extending handle to facilitate manual rotation of said key between locked and unlocked positions.

25. A lock arrangement as set forth in claim 24, wherein:
said second key surface comprises a generally ovate lobe which engages and deforms an adjacent portion of said tube during the locked position, and is continuously urged into the unlocked position by the resiliency of the deformed tube portion;

said handle is oriented in a predetermined angular relationship with respect to said lobe, wherein said handle abuts said tube to retain said key in an over-centered, locked position on said tube.

26. A lock arrangement as set forth in claims 24 or 25, wherein:

said handle has an arcuate plan shape adapted to generally conform with the exterior surface of said tube.

27. A lock arrangement as set forth in claim 1, wherein:

said keyway extends through one end of said collar to facilitate insertion and removal of said key from said keyway.

28. A lock arrangement as set forth in claim 1, wherein:

said key has a length which is selected in accordance with the locking force required for a particular application.

29. A lock arrangement as set forth in claim 1, wherein:

said first and second key surfaces are positioned 90° apart.

30. A lock arrangement as set forth in claim 1, wherein:

said key has a generally cylindrical shape with a flat extending along one side thereof.

31. A lock arrangement as set forth in claim 1, wherein:

said keyway has a generally U-shaped transverse cross section.

32. A lock arrangement as set forth in claim 1, wherein:

the central opening of said collar, and the outer surface of said tube are cylindrical in shape, and have respective diameters; and the diameter of the central opening of said collar is greater than the outside diameter of said tube by an amount in the range of 1/32 to ⅛ inches to insure smooth, non-binding translation of said collar over said tube even in the presence of surface anomlies.

33. A lock arrangement as set forth in claim 1, including:

a second, thin-walled tube having one end shaped to telescopingly receive said first named tube therein; and wherein said collar is integrally formed in the one end of said second tube, and said key detachably interconnects said first and second named tubes in a selected longitudinal relationship.

34. A lock arrangement as set forth in claim 33, wherein:

said one end of said second tube includes a sidewall defining said collar, with a die formed pocket which defines said keyway.

35. A lock arrangement as set forth in claim 34, wherein:

said pocket is integral with said collar.

36. A lock arrangement as set forth in claim 1, wherein:

said central opening extends through opposite ends of said collar, thereby permitting said collar to slide freely over said rod, and to be locked thereto at any position along its length.

37. A lock arrangement as set forth in claim 36, wherein:

said collar has a length sufficient to simultaneously receive one end of said tube, and one end of a second tube therein; and said key extends along a major portion of said keyway to engage the one ends of both said first and second tubes in the located position and securely interconnect the same.

38. A lock arrangement as set forth in claim 1, including:

serrations on that portion of said collar interior surface disposed opposite said keyway for gripping engagement with the exterior surface of said tube.

39. A lock arrangement as set forth in claim 1, wherein:

said collar has a length sufficient to simultaneously receive one end of said tube, and one end of a second tube therein;

said keyway extends along the entire length of said collar, and opens through opposite ends thereof;

said key is inserted into one end of said keyway, and selectively abuts an adjacent one of said tubes; and including a second eccentric key inserted into the other end of said keyway, and selectively abutting the other of said tubes.

40. A lock arrangement as set forth in claim 39, wherein:

said tubes have different diameters.

41. A lock arrangement as set forth in claim 1, including:

a second rigid collar extending transversely from said first named collar, and adapted to receive a rod-shaped cross brace therein; and said second collar having a keyway with an eccentric key rotatably received therein; said key having a first surface which when positioned adjacent said cross brace permits relative longitudinal translation therebetween, and a second surface which is rotated into abutting contact with said cross brace to frictionally interconnect the same.

* * * * *

UNITED STATES PATENT AND TRADEMARK OFFICE
CERTIFICATE OF CORRECTION

PATENT NO. : 4,435,105
DATED : March 6, 1984
INVENTOR(S) : Neil Rampley

It is certified that error appears in the above-identified patent and that said Letters Patent is hereby corrected as shown below:

Column 5, line 4:

"size" should be --sized--

Column 9, claim 32, line 44:

"anomlies" should be --anomalies--

Column 10, claim 37, line 20:

"located" should be --locked--

Signed and Sealed this

Second Day of October 1984

[SEAL]

*Attest:*

*Attesting Officer*

GERALD J. MOSSINGHOFF

*Commissioner of Patents and Trademarks*